(12) United States Patent
Bosco

(10) Patent No.: US 12,708,124 B2
(45) Date of Patent: Aug. 18, 2026

(54) POPSICLE DEMOLDING MACHINE

(71) Applicant: Claudemir Bosco, Araçatuba (BR)

(72) Inventor: Claudemir Bosco, Araçatuba (BR)

( * ) Notice: Subject to any disclaimer, the term of this patent is extended or adjusted under 35 U.S.C. 154(b) by 459 days.

(21) Appl. No.: 18/549,729

(22) PCT Filed: Mar. 7, 2022

(86) PCT No.: PCT/BR2022/050075
§ 371 (c)(1),
(2) Date: Sep. 8, 2023

(87) PCT Pub. No.: WO2022/187923
PCT Pub. Date: Sep. 15, 2022

(65) Prior Publication Data

US 2024/0148017 A1 May 9, 2024

(30) Foreign Application Priority Data

Mar. 8, 2021 (BR) ......................... 102021004333-4

(51) Int. Cl.
*A23G 9/26* (2006.01)
*A23G 9/22* (2006.01)

(52) U.S. Cl.
CPC ............... *A23G 9/26* (2013.01); *A23G 9/221* (2013.01)

(58) Field of Classification Search
CPC . A23G 9/26; A23G 9/221; A23G 9/48; A23G 9/04; A23G 9/225; A47J 43/20
See application file for complete search history.

(56) References Cited

U.S. PATENT DOCUMENTS

| | | | |
|---|---|---|---|
| 6,156,366 | A | 12/2000 | Waldstroem et al. |
| 6,713,101 | B2 | 3/2004 | Lometillo et al. |
| 8,961,163 | B2 | 2/2015 | Zorovich et al. |
| 2016/0227814 | A1 | 8/2016 | Arpino |
| 2016/0262423 | A1 | 9/2016 | Broser |

(Continued)

FOREIGN PATENT DOCUMENTS

| | | |
|---|---|---|
| BR | 9204622 | 5/1994 |
| BR | 7702677 | 7/1999 |
| BR | MU8602363 | 6/2008 |

(Continued)

OTHER PUBLICATIONS

International Search Report for PCT/BR2022/05075 dated Apr. 21, 2022.

*Primary Examiner* — Robert G Bachner
(74) *Attorney, Agent, or Firm* — B. Aaron Schulman, Esq.; Stites & Harbison, PLLC

(57) ABSTRACT

A popsicle demolding machine for popsicles is provided that has one or two vertical channels, wherein the popsicle demolding machine receives a mold formed by a set of cavities. The popsicle demolding machine has a lower reservoir for heating water, and a demolding tank internally provided with a guide coupled to the demolding tank. The demolding tank receives hot water from the lower reservoir through a pump so that the hot water applies a thermal shock to walls of the set of cavities. The hot water flows back to the lower reservoir through upper ends of vertical capillaries, allowing the set of cavities to be peripherically heated, including walls of inner tubes of the set of cavities for modeling the vertical channels, so that the popsicles can be extracted without damaging walls of the vertical channels, making it possible to manufacture said popsicles.

10 Claims, 11 Drawing Sheets

(56) References Cited

U.S. PATENT DOCUMENTS

Figure 1:
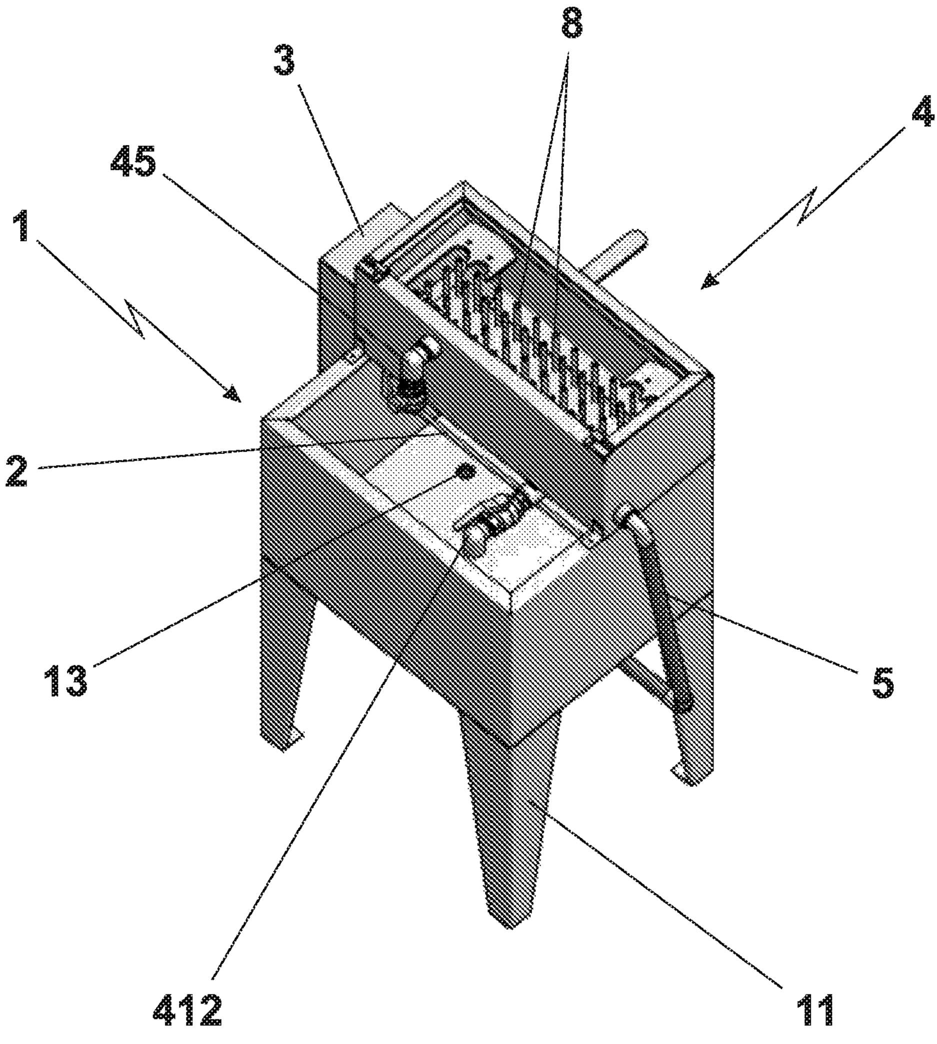

| | | | |
|---|---|---|---|
| 2023/0337696 | A1 | 10/2023 | Bosco |

FOREIGN PATENT DOCUMENTS

| | | | |
|---|---|---|---|
| BR | PI1103585 | | 9/2015 |
| BR | 202016011043 | | 11/2017 |
| BR | 102017013361 | | 1/2019 |
| BR | 202017025684 | | 6/2019 |
| BR | 202017025690 | | 6/2019 |
| CN | 106306317 | | 1/2017 |
| CN | 109123052 | A | 1/2019 |

POPSICLE DEMOLDING MACHINE

The present patent refers to a new popsicle demolding machine, pertaining to the technical sector of the ice cream industry accessories, more particularly a popsicle demolding machine provided with one or two vertical holes which require the walls of the mold cavities to be heated peripherically heated, including the walls of the inner pipes of the cavities for molding the respective popsicle holes, so that the popsicles can be removed therefrom without damaging the walls of the respective holes, thus making it possible to manufacture said popsicles in a practical, safe and functional way.

In accordance with document BR102020000649-5 of the same applicant, "A popsicle is a solidified ice cream, currently presented in different forms, some of which are thematic, which is handled at the end of a stick that is inserted through the lower face and partially attached to the body of the popsicle. The body of the popsicle which is presented in different forms, more usually in the shape of number "8", is usually a solid body without any filling (or the filling is solidified inside the body of the popsicle in the event it is filled) while it is produced".

Thus, aiming at obtaining an innovating way to consume the popsicle, said document BR102020000649-5 discloses a "POPSICLE TO BE FILLED" which is provided with two holes that allow for a large variation of ways to consume the popsicle which comprises a solidified body of different shapes, into the lower face of which a stick of different shapes is inserted conventionally, provided in the upper face with at least a cylindrical, elliptical, square, rectangular cross-section or any other geometric shape hole that makes up the receptacle to receive liquid, solid or granulated filling by the time it is consumed.

In order to make a popsicle with one or two holes, a special mold provided with one or two inner pipes of the cavity having the desired shape (model) closed on the upper face at the boundary of the depth of the respective holes is required.

In view of this innovative way of consuming popsicles, a great challenge takes place by the time it is produced when the manufacturer cannot extract the product at all.

In order to solve the state of the art problem, the popsicle demolding machine object of the present invention was developed, which machine comprises a lower water heating reservoir, to which the demolding tank which receives the hot water from the lower reservoir through a pump is coupled, so that the hot water thermally shocks the walls of the cavities of the popsicle, including the walls of the vertical inner pipes of the cavities and then the water flows back to the reservoir through the capillaries which remove the air generated inside the pipes allowing same to be heated, thus solving the problem identified in the art and making the innovation proposed in document BR10202000046-5 viable, besides providing other advantages from its conception.

Figure 2:
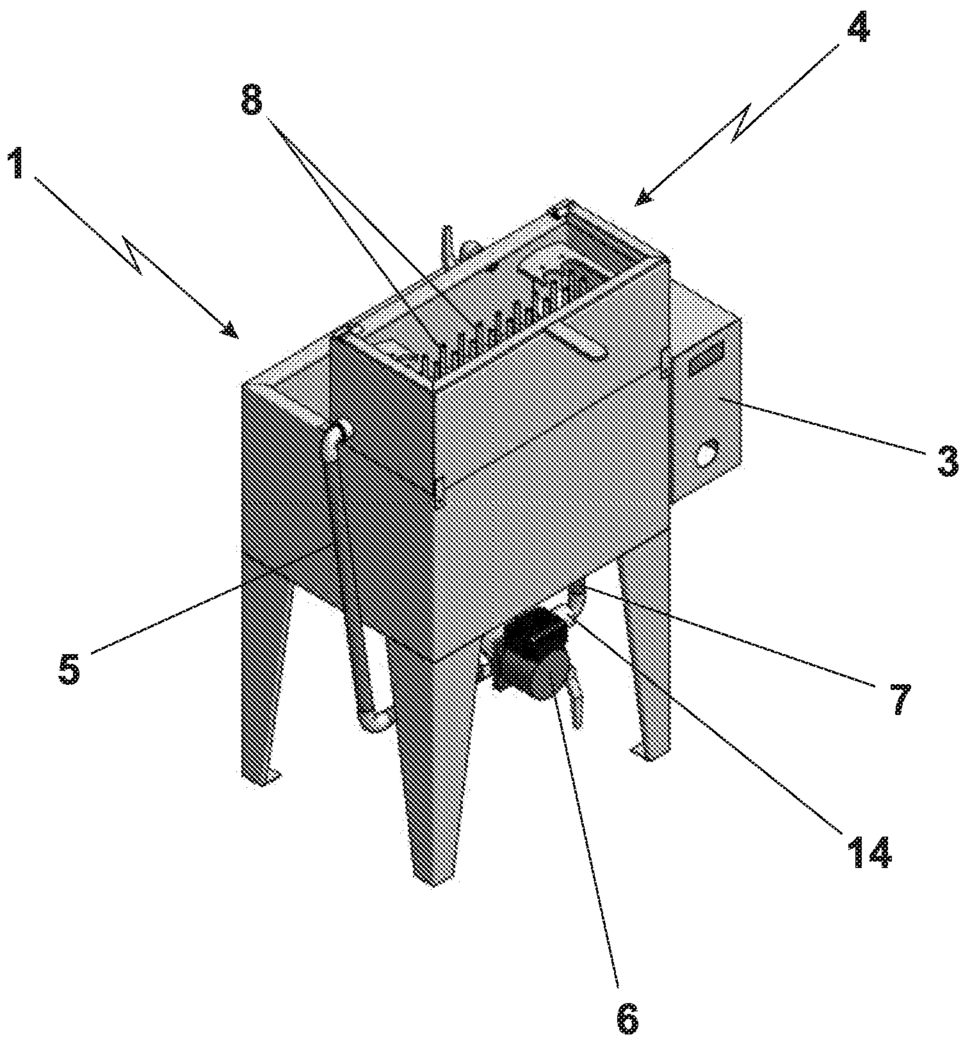
Figure 3:
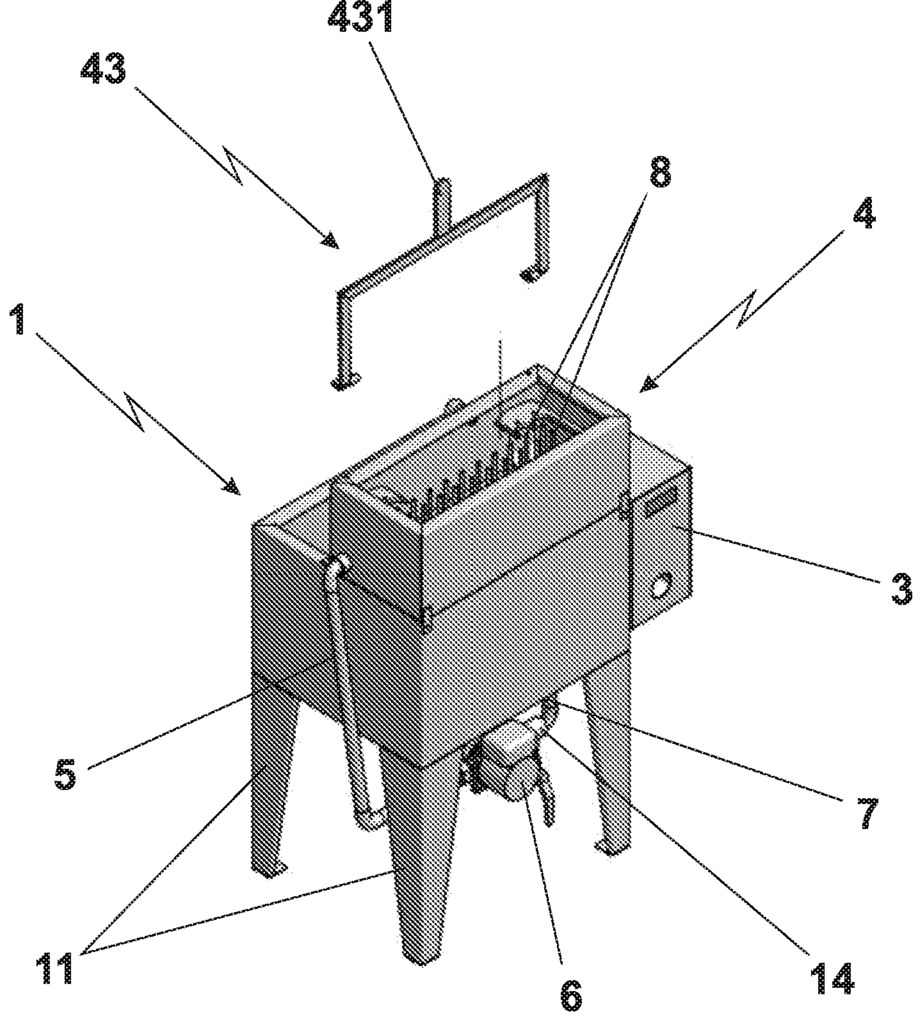
Figure 4:
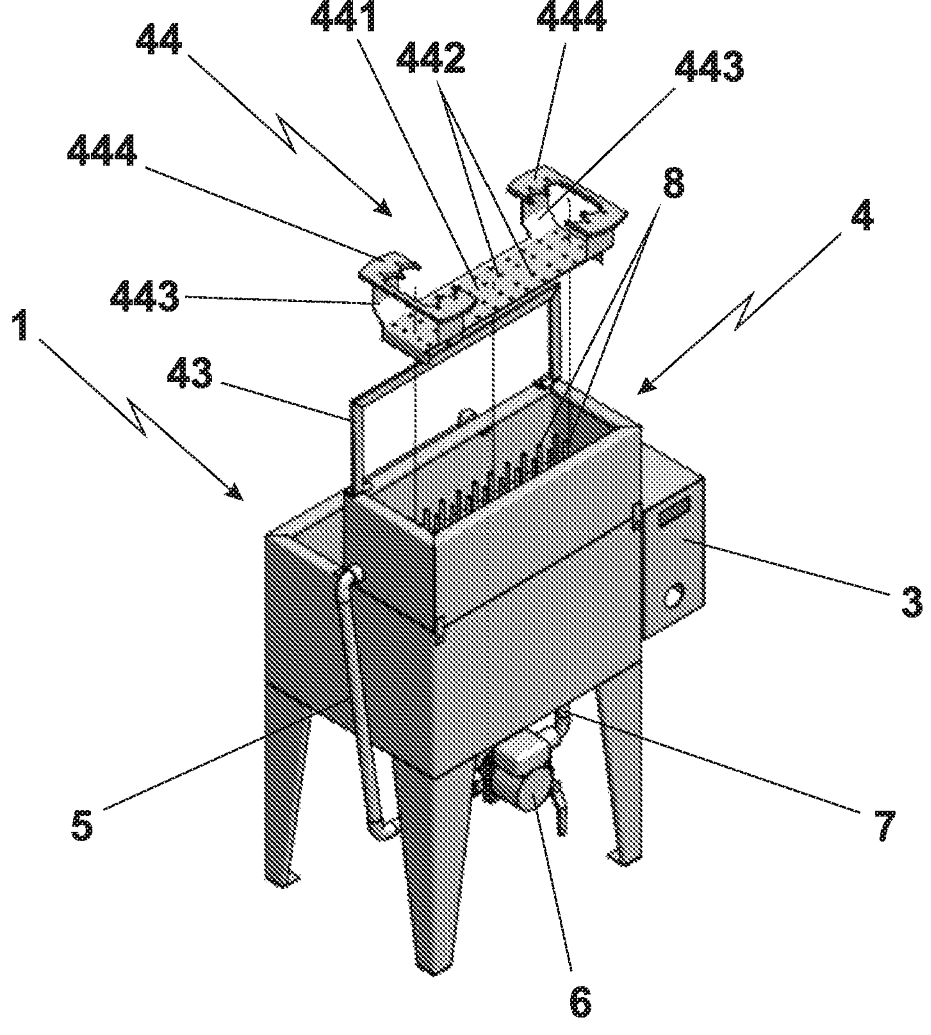
Figure 5:
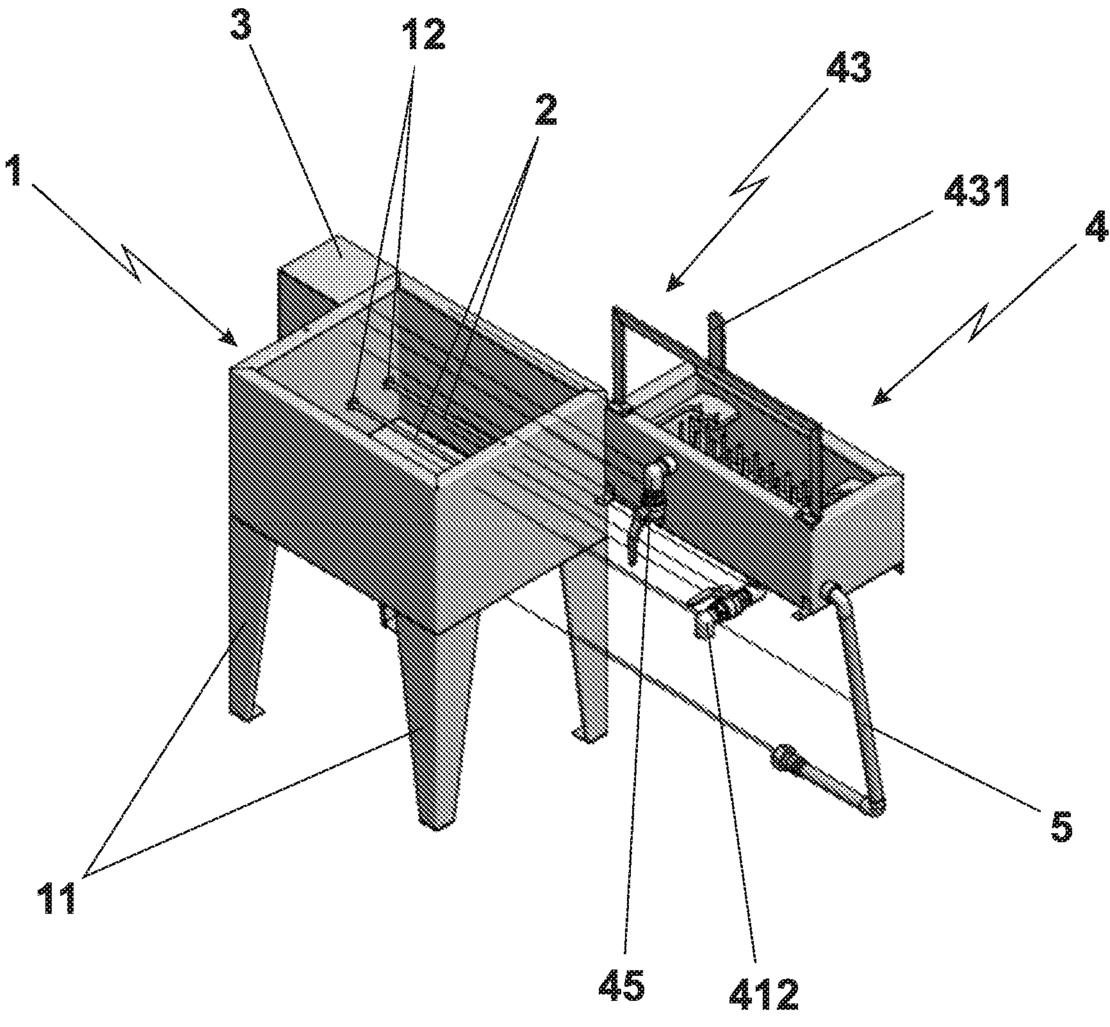
Figure 6:
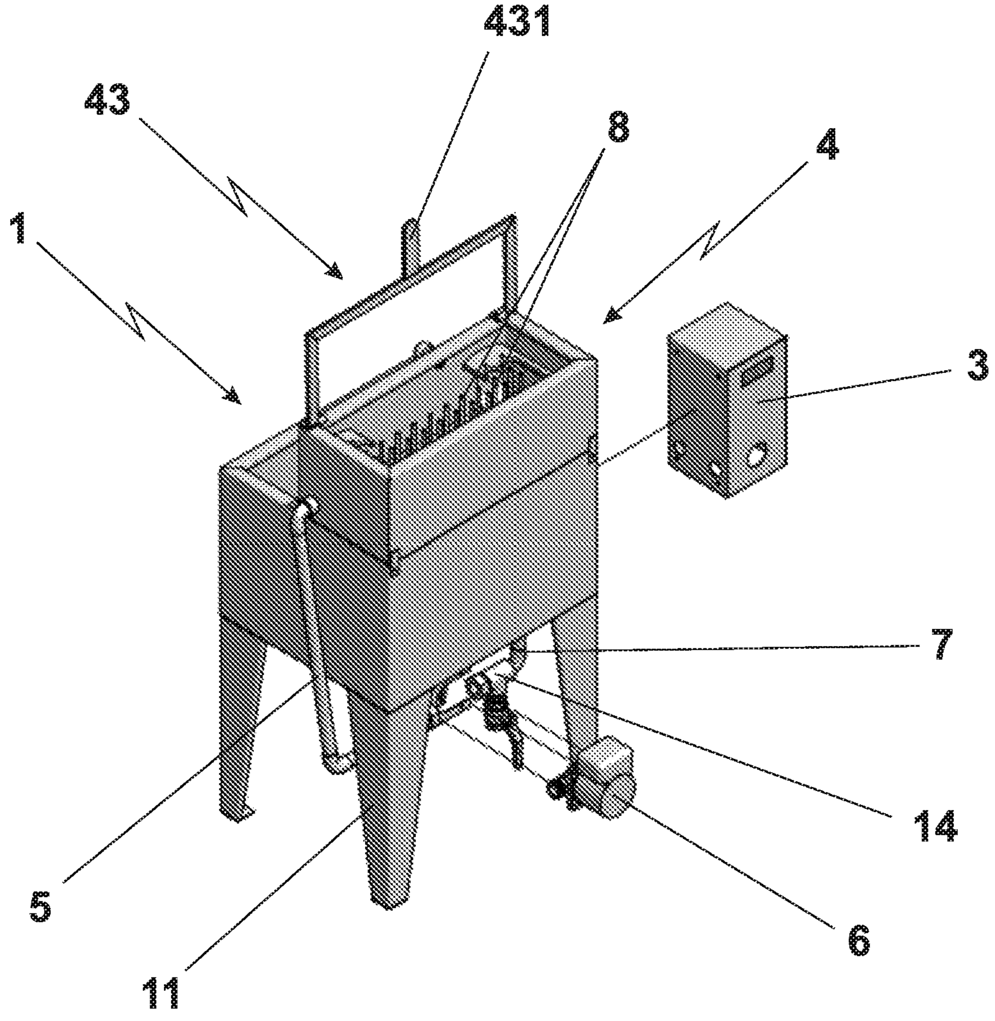
Figure 7:
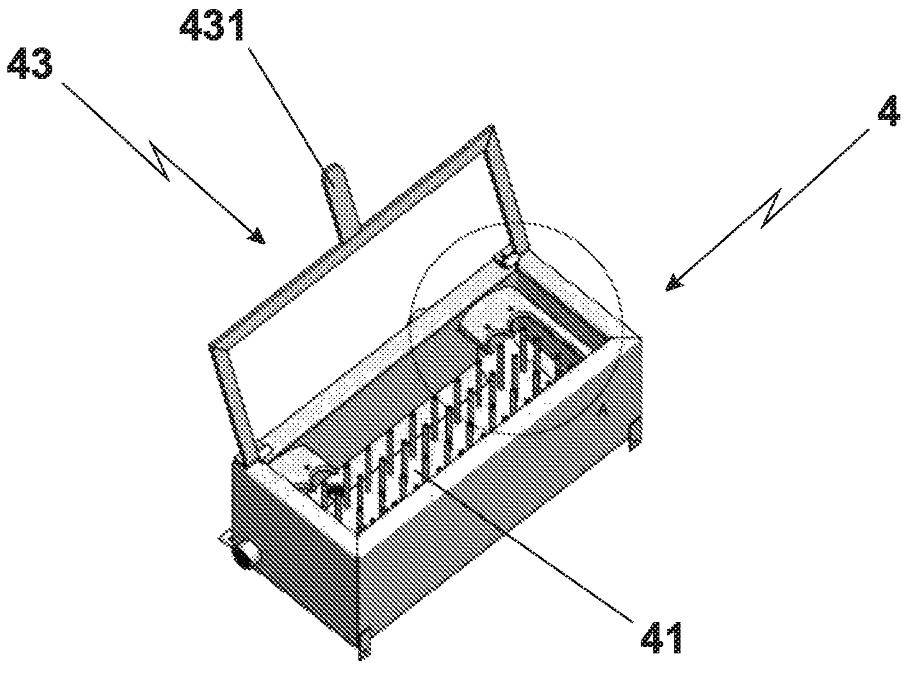
Figure 8:
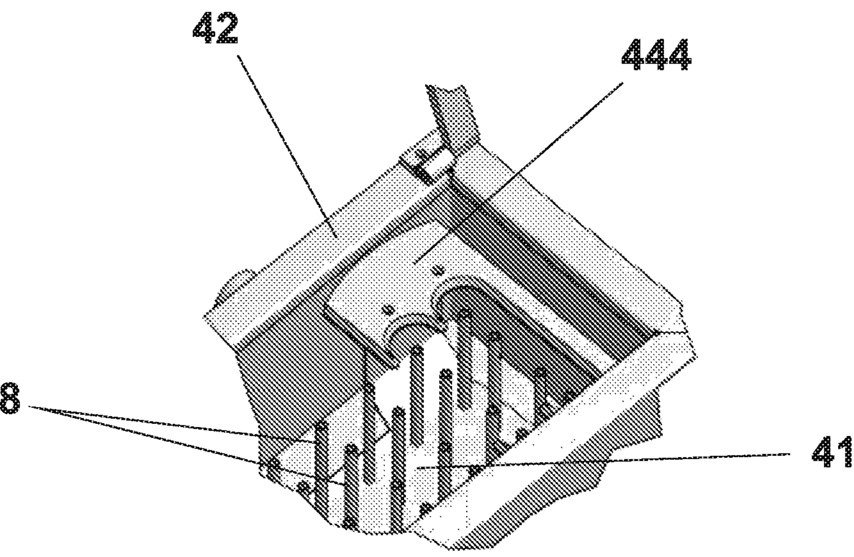
Figure 9:
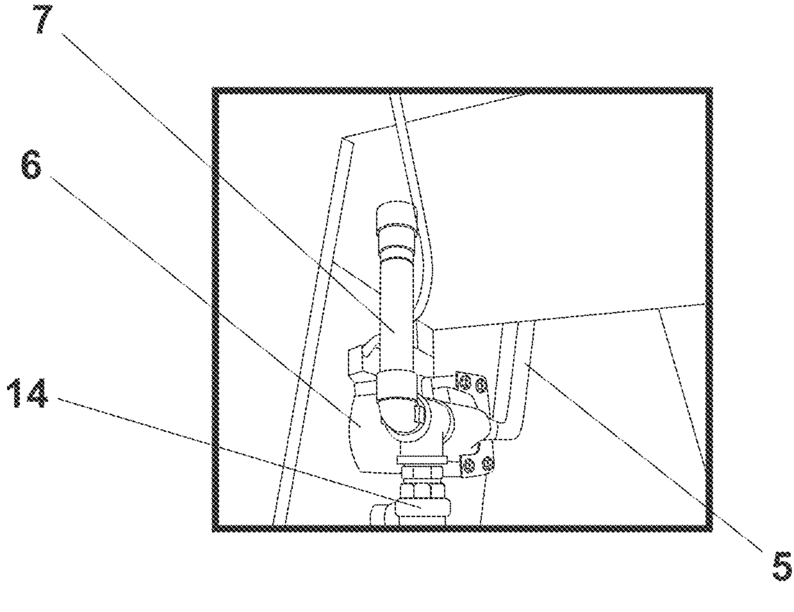
Figure 10:
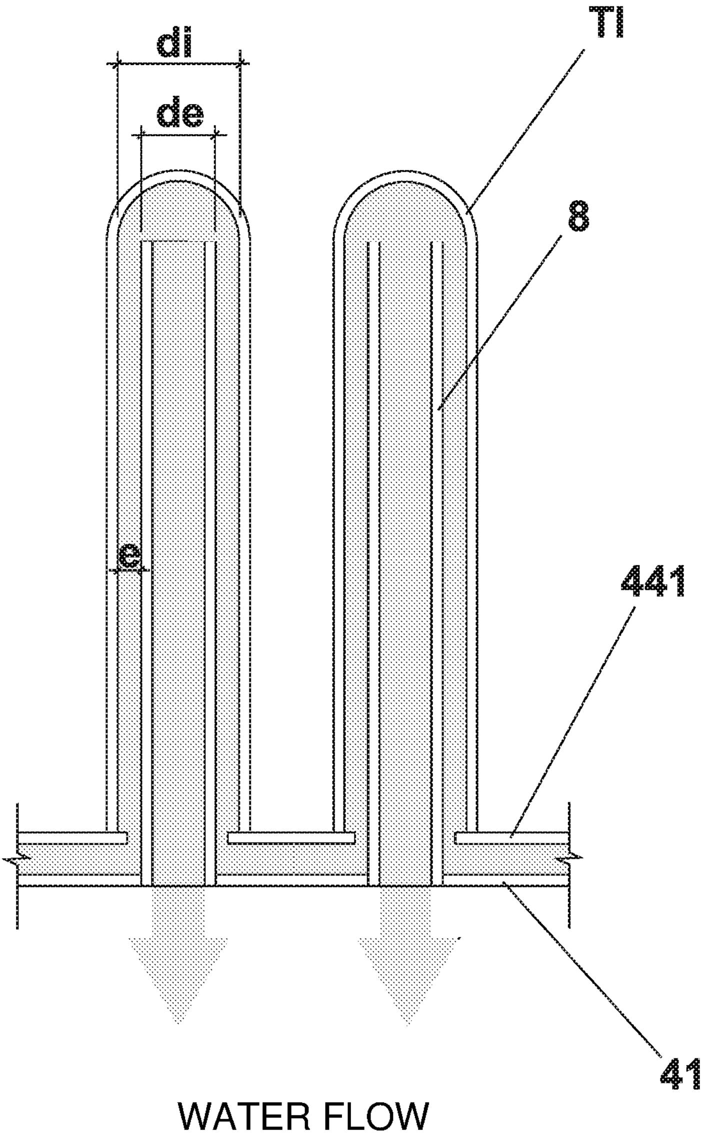
Figure 11:
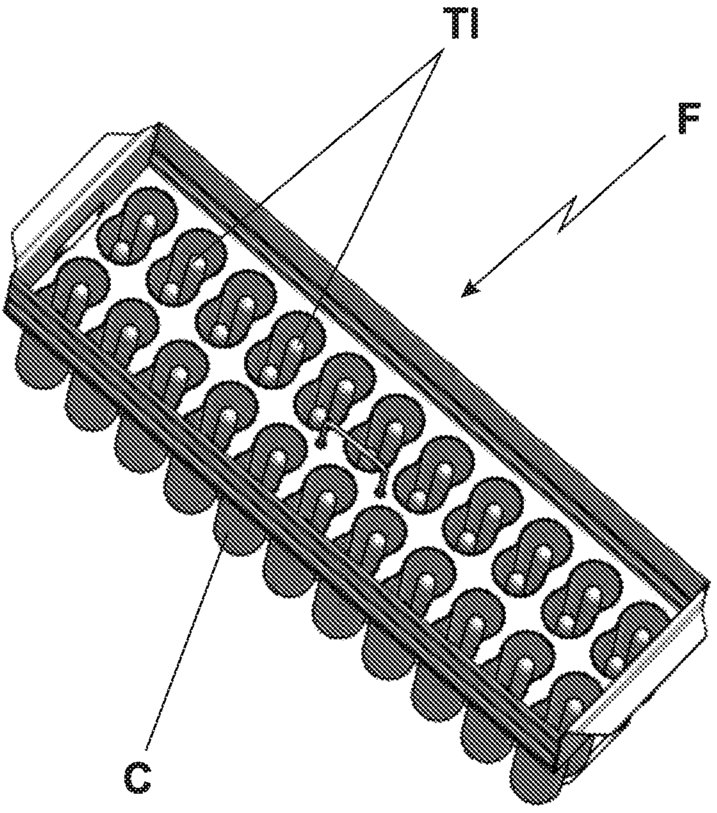
Figure 12:
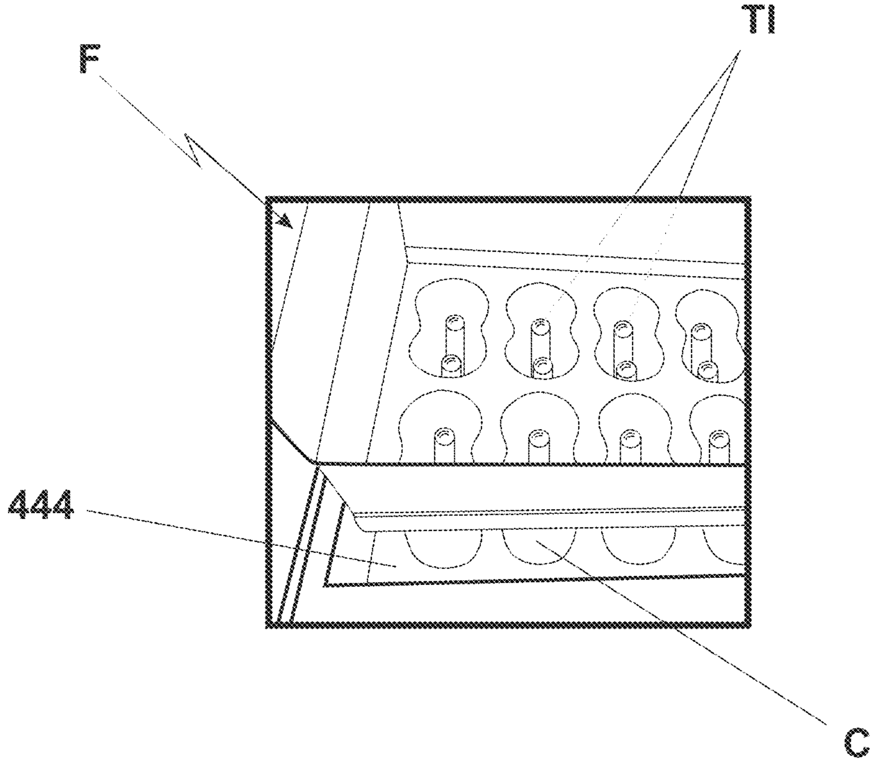

The present patent will be better understood in the attached drawings that schematically represent the following:

FIG. 1—a perspective view of the new popsicle demolding machine, distinguishing the front, upper and right side faces;

FIG. 2—a perspective view of the popsicle demolding machine, distinguishing the back, upper and right side faces;

FIG. 3—a perspective view of the popsicle demolding machine, showing the locking handle in an exploded view;

FIG. 4—a perspective view of the popsicle demolding machine, showing the guide of the set of cavities in an exploded view;

FIG. 5—a perspective view of the popsicle demolding machine, showing the demolding tank in an exploded view;

FIG. 6—a perspective view of the popsicle demolding machine, showing the energy box and the pump in an exploded view;

FIG. 7—a perspective view of the demolding tank;

FIG. 8—an amplified detail of a portion of the demolding tank;

FIG. 9—a detail of the pump side;

FIG. 10—a schematic cut view of the flow of water between the inner pipes of the cavity and the vertical capillaries;

FIG. 11—a detailed perspective view of the set of molds positioned on the demolding tank.

According to the figures, the popsicle demolding machine receives the mold (F) consisting of a set of cavities (C) and comprising a lower reservoir (1) for heating the water through resistors (2) attached to an energy box (3), on which edge the demolding tank (4) is coupled and internally provided with a guide (44) which receives the hot water through a piping (5) from the lower reservoir (1), by means of a pump (6) which receives same from the lower reservoir (1) through the piping (7), in such a way with that the hot water applies a thermal shock to the walls of the cavities (C) of popsicles and then flows back to the lower reservoir (1) through the upper ends of the vertical capillaries (8) which extract the air generated inside the cavities (C), allowing same to be heated.

The lower reservoir (1), preferentially in the shape of a parallelepiped, is provided with feet (11) one side of which is attached to the energy box (3) provided with holes (12) on the same side for coupling the resistors (2) and on the lower face of the hole (13) for coupling the piping (7) which is connected to a slide valve (14) for extracting the water from the lower reservoir (1) which is in turn coupled to the pump (6).

The demolding tank (4), preferentially in the shape of a parallelepiped, is provided with a slide valve (412) for extracting the water on the bottom (41) thereof, and holes having a diameter which is the same as that of the vertical capillaries (8), the lower ends of which are welded at the edges of the holes in the bottom (41). Said demolding tank (4) has an open upper face provided with tabs (42) to accommodate the edge of the mold (F), and a handle (43) is also provided at the edge with a grasping region (431) for locking the mold (F), and a level slide valve (45) is also provided on the front face for controlling the water level in the demolding tank (4).

Internally provided is a guide (44) formed by a base (441) which restrains the positioning of the height of the mold (f) and cavities (C), having holes (442) that fit into the vertical capillaries (8) the ends of which have arms (443) that receive the guides (444) at the ends thereof in the shape of a "C" of the cavities (C), so that they fit perfectly into the vertical capillaries (8) without the risk of damaging same and keeping the correct distance between the vertical capillaries (8) and the walls of the cavities (C).

Each mold (F) comprises a set of cavities (C) of different geometric shapes, each cavity (C) being provided with two inner pipes (TI) of different geometric shapes, to fit into the respective vertical capillaries (8) having inner diameters (di) longer than the outer diameters (de) of the vertical capillaries (8), forming a space (e) for the water to flow and get into the upper ends of the vertical capillaries (8) and then flow back to the lower reservoir (1). Optionally, each cavity (C) of the mold (F) can be provided with only one inner pipe (TI).

The new popsicle demolding machine is very easy to use, since it is enough to fill the lower reservoir (1) with water, heat same with resistors (2) that are connected to the energy box (3) and then, after reaching the optimum temperature to demold the popsicle, the water is pumped by the pump (3) to the demolding tank (4) until the level of the upper end of the vertical capillaries (8) are reached, and so the water flows back to the lower reservoir (1), and then, with the aid of the guide (44), the mold (F) is fit with its cavities (C) into the demolding tank (4), thus embedding the vertical capillaries (8) into the inner pipes (TI) of the cavities (C) which will keep a space (e) between the walls, and lock the mold (F) with the handle (43), so that the hot water applies a thermal shock to the walls of the cavities (C) of the mold (F) of the popsicle, including the walls of the inner pipes (TI) of the cavities (C). Then it is enough to remove the mold (F), and the popsicle can be taken out of the mold.

Finally, in order to take the water out of both the reservoir (1) and the demolding tank (4) it is enough to open the slide valves (14) and (45) respectively.

The thus conceived popsicle demolding machine provides the following advantages:

- it is possible to demold/extract popsicles with one or more filling holes without damaging the inner and outer walls, a task which cannot be carried if the conventional way is used since it would not be possible to extract the product;
- an easy-to-handle machine;
- a safe demolding operation is provided;
- it provides both the manufacture and commercialization of popsicles with holes to be filled;
- the machine makes it possible to bring an innovative product to the popsicle market;
- fast production; and
- standardization.

Therefore, the scope of the present invention shall not be limited to the constructive details, but only to the terms defined in the claims and the equivalents thereof.

The invention claimed is:

1. A popsicle demolding machine comprising:

a demolding tank having vertical capillaries and a guide for receiving a mold consisting of a set of cavities;

a lower reservoir for heating water through resistors connected to an energy box;

wherein the demolding tank receives the heated water through a first pipe by means of a pump coupled to the first pipe, the pump receiving the heated water from a second pipe coupled to the pump, the second pipe receiving water from the lower reservoir;

wherein the heated water pumped up to the demolding tank from the lower reservoir applies a thermal shock to walls of the set of cavities; and wherein the heated water flows back to the lower reservoir through upper ends of the vertical capillaries to remove air inside the set of cavities to allow the set of cavities to be heated up.

2. The popsicle demolding machine according to claim 1, wherein the lower reservoir is in the shape of a parallelepiped and provided with feet.

3. The popsicle demolding machine according to claim 1, wherein one side of the energy box is attached to one side of the lower reservoir, said one side of the energy box and said one side of the lower reservoir each having a plurality of holes for coupling the resistors of the lower reservoir to the energy box.

4. The popsicle demolding machine according to claim 1, wherein one side of the lower reservoir has an opening to couple the lower reservoir to the second pipe, the second pipe being connected to the pump by a slide valve for extracting the heated water from the lower reservoir.

5. The popsicle demolding machine according to claim 1, wherein the demolding tank is in the shape of a parallelepiped and provided with a slide valve for draining the heated water from the bottom of the demolding tank.

6. The popsicle demolding machine according to claim 1, wherein the demolding tank has a plurality of apertures each with a diameter that is the same as that of the vertical capillaries, and wherein lower ends the vertical capillaries are welded at the edges of the plurality of apertures at the bottom of the demolding tank.

7. The popsicle demolding machine according to claim 1, wherein the demolding tank further comprises:

an open upper face provided with tabs to accommodate edges of the mold;

a handle provided at an edge of the open upper face, the handle having a grasping region to lock the mold; and a level slide valve to control the water level in the demolding tank.

8. The popsicle demolding machine according to claim 1, wherein the guide comprises:

a base which restrains the positioning of the mold and in turn the set of cavities of the mold; the base having a plurality of holes suitable to fit the vertical capillaries;

arms that extend upward from the base, and

C-shaped |supports attached to top of the arms that receive the mold to maintain a distance between the walls of the set of cavities and the vertical capillaries.

9. The popsicle demolding machine according to claim 1, wherein each of the set of cavities of the mold has two inner tubes of a desired geometric shape to fit onto the vertical capillaries, the two inner tubes having inner diameters longer than outer diameters of the vertical capillaries, forming a space for the heated water to flow into the upper ends of the vertical capillaries and then flow back to the lower reservoir.

10. The popsicle demolding machine according to claim 1, wherein each of the set of cavities of the mold has one inner tube having a geometric shape to fit onto the vertical capillaries, the one inner tubes having an inner diameter longer than the outer diameter of the vertical capillaries, forming a space for the heated water to flow into the upper ends of the vertical capillaries and then flow back to the lower reservoir.

* * * * *